US009785697B2

(12) United States Patent
Chércoles Sánchez et al.

(10) Patent No.: US 9,785,697 B2
(45) Date of Patent: Oct. 10, 2017

(54) METHODS AND APPARATUS FOR IMPLEMENTING A DISTRIBUTED DATABASE

(75) Inventors: José Maria Chércoles Sánchez, Madrid (ES); Berta Isabel Escribano Bullon, Madrid (ES); Roman Ferrando Llopis, Alcombendas (Madrid) (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 437 days.

(21) Appl. No.: 14/410,463

(22) PCT Filed: Jun. 29, 2012

(86) PCT No.: PCT/EP2012/062766
§ 371 (c)(1),
(2), (4) Date: Dec. 22, 2014

(87) PCT Pub. No.: WO2014/000822
PCT Pub. Date: Jan. 3, 2014

(65) Prior Publication Data
US 2015/0324444 A1 Nov. 12, 2015

(51) Int. Cl.
G06F 17/30 (2006.01)
(52) U.S. Cl.
CPC .. *G06F 17/30598* (2013.01); *G06F 17/30289* (2013.01); *G06F 17/30371* (2013.01); *G06F 17/30545* (2013.01); *G06F 17/30584* (2013.01)

(58) Field of Classification Search
CPC ............... G06F 17/30289; G06F 17/30545
See application file for complete search history.

(56) References Cited

U.S. PATENT DOCUMENTS

| 6,216,126 | B1* | 4/2001 | Ronstrom | G06F 9/466 |
| 8,041,735 | B1* | 10/2011 | Lacapra | G06F 17/30194 707/783 |
| 2006/0036748 | A1* | 2/2006 | Nusbaum | G06F 17/30867 709/228 |
| 2013/0166502 | A1* | 6/2013 | Walkauskas | G06F 17/30598 707/610 |

OTHER PUBLICATIONS

Independent Submission by K. Zeilenga, Title: "Lightweight Directory Access Protocol (LDAP) Transactions", Request for Comments (RFC): 5805, Category: Experimental, ISSN: 2070-1721, dated Mar. 2010 consisting of 11-pages.

(Continued)

*Primary Examiner* — Grace Park
(74) *Attorney, Agent, or Firm* — Christopher & Weisberg, P.A.

(57) ABSTRACT

According to a first aspect of the present invention there is provided a method of operating a distributed database comprising a plurality of database nodes each storing a plurality of data objects. The method comprises, when executing a database transaction that requires data operations be performed on a plurality of data objects that are distributed between two or more of the database nodes, grouping the data objects that are involved in the database transaction at one of the plurality of database nodes.

25 Claims, 8 Drawing Sheets

(56) References Cited

OTHER PUBLICATIONS

Data Management Research Group: Title: "Data Management Research at NEC Labs", NEC Laboratories America, [http://www.nec-labs.com/dm/], {hakan}@sv.nec-labs.com, SIGMOD Record, vol. 40, No. 3:38-44, Sep. 2011 consisting of 7-pages.
International Search Report and Written Opinion dated Jul. 20, 2013 for International Application Serial No. PCT/EP2012/062766, International Filing Date: Jun. 29, 2012 consisting of 16-pages.
Ashkan Bayati et al.: "A Novel Way of Determining the Optimal Location of a Fragment in a DDBS: BGBR", Systems and Networks Communication, 2006. ICSNC '06. International Conference on IEEE, PI, pp. 64-64, XP031033929, ISBN: 978-0-7695-2699-7, Oct. 1, 2006 (Oct. 1, 2006), consisting of 6-pages.
Nilarun Mukherjee: "Non-Replicated Dynamic Fragment Allocation in Distributed Database Systems", Communications in Computer and Information Science, Springer, DE, vol. 131, pp. 560-569, XP009168803, ISSN: 1865-0929, DOI: 10.1007/978-3-642-17857-3_55, Jan. 1, 2011 (Jan. 1, 2011) consisting of 10-pages.
Database Transaction from Wikipedia, the free encyclopedia, [[http://en.wikipedia.org/w/index.php? title=Database_transaction &oldid]], Apr. 27, 2012 consisting of 4-pages.
Datastore Overview—Google App Engine—Google Developers: Title: "Datastore Overview", [[https://developers.google.com/appengine/docs/java/datastore/overview]] Java Datastore API, May 3, 2012 consisting of 25-pages.

\* cited by examiner

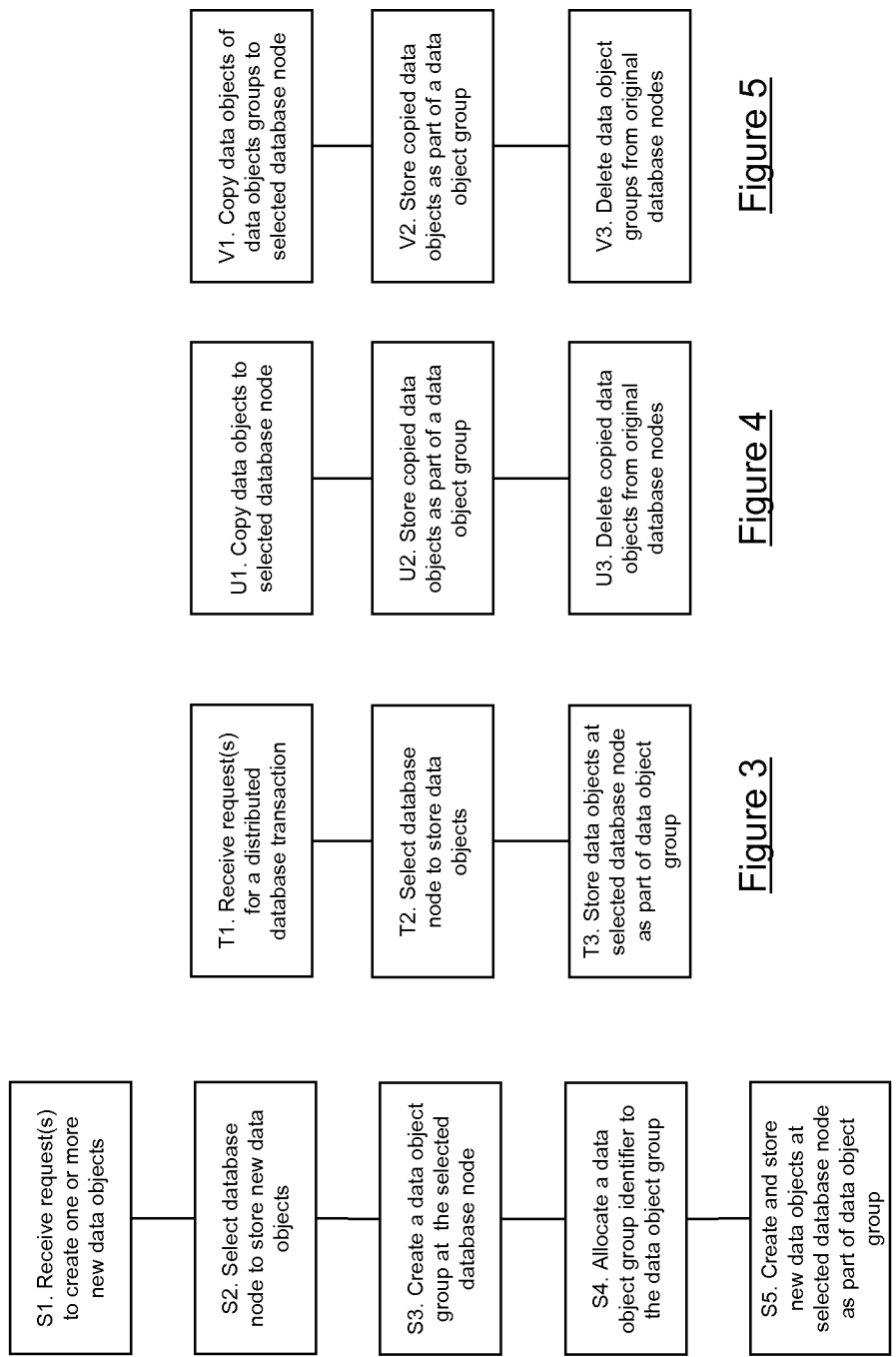

METHODS AND APPARATUS FOR IMPLEMENTING A DISTRIBUTED DATABASE

FIELD OF THE INVENTION

This invention relates to a method of operating a distributed database and corresponding apparatus. More particularly, the invention relates to a method of operating a distributed database that optimises the distribution of data among the nodes of the distributed database.

BACKGROUND TO THE INVENTION

Distributed databases solve the scalability problem of storing a vast volume of data when the storage capacity of a single database does not suffice. In this regard, a distributed database is a database in which the data is not stored at a single physical location. Instead, it is spread across a network of database nodes that are geographically dispersed and connected via communications links.

FIG. 1 illustrates schematically an example of a distributed database system providing data access to database clients. The distributed database is comprised of a number of database (DB) nodes, and a number of client interface nodes with which database clients interact in order to access the data stored in the distributed database. Each database node has a storage unit for storing data objects, and an interface to one or more of the client interface nodes. The client interface nodes also have an interface with one or more database clients of the distributed database via which they receive requests for database transactions, wherein each database transaction requires one or more data operations (also known as database queries) be performed on data objects that are stored or that are to be stored in the distributed database.

In order to determine which database node of the distributed database stores or is to store a data object to which a data operation relates, each client interface node can be provided with distribution logic that determines which database node should store a data object. Moreover, each client interface node that receives and processes requests for database transactions will typically be required to implement transaction manager functionality that applies the "ACID" properties to a database transaction so as to ensure the proper execution of that database transaction. These "ACID" properties are atomicity, consistency, isolation, and durability.

As described above a database transaction requested by a database client can require more than one data operation. Consequently, it is often the case that such a database transaction will require data operations be performed on a plurality of data objects, where these data objects are distributed between a number of the database nodes. Such a database transaction is referred to as a distributed database transaction, and will require that a client interface node communicate with more than one database node in order to execute/implement the distributed database transaction. For example, the dot-dash lines on FIG. 1 illustrate a distributed transaction that requires a first data operation be performed on data object x and a second data operation be performed on data object y, where data object x is stored at database node A and data object y is stored at database node B.

Current trends in the use of distributed databases suggest that distributed transactions will become more common. For example, in order to take advantage of the scalable storage capacity provided by a distributed database, there is a trend for services that are required to store and/or make use of large amounts of data to be implemented using a tiered or layered architecture, wherein an application layer implements the actual service provision and processing and a separate database layer is used to store the service data. The application layer is therefore comprised of application servers that act as database clients, whilst the database layer is comprised of the distributed database. An example of a service that can make use of such a tiered or layered architecture is that of a Home Location Register (HLR) or a Home Subscriber Server (HSS) of a telecommunications network, in which "dateless" front-end servers provide the service application logic using data stored in a back-end distributed database. Furthermore, this trend towards tiered or layered service architectures has enabled service provides to aggregate the service data of multiple services within a single distributed database, which can significantly increase the volume of data stored within the distributed database. This increase in the volume of data therefore requires that the distributed database has a greater number of database nodes, which in turn increase the likelihood that distributed database transactions will occur. In addition, the increased usage of mainstream, off-the-shelf hardware by service providers implies that the individual database nodes of a distributed database will have less storage capacity, such that the distributed database will require a greater number of database nodes in order to store the same volume of data, which also increases the likelihood that distributed database transactions will occur.

This increase in the occurrence of distributed database transactions has a negative impact on the performance of a distributed database, due to the increase in the database response times caused by the need for a client interface node to communicate with more than one database node when executing/implementing a database transaction. This is particularly true for databases that make use of the two-phase commit (2PC) protocol or three-phase commit (3PC) protocol to implement the database operations of a distributed database transaction, as these protocols are already relatively expensive in terms of performance and response times.

In scenarios in which a distributed database stores the data of a single service/application, or of a number of very similar services/applications, it may be possible to reduce the number of distributed database transactions that occur by manually configuring the distribution of data between the database nodes. For example, in the case of a HLR and/or HSS application, the data can be distributed among the plurality of database nodes that form the distributed database based on ranges of numerical user identifiers, such as the International Mobile Subscriber Identity (IMSI) or Mobile Subscriber Integrated Services Digital Network Number (MSISDN). However, such a solution requires experts in the operation of these services/applications to configure the distributed database with an optimised data distribution. Moreover, this kind of approach does not fit well in scenarios in which a distributed database stores the data of multiple applications, especially when there is no particular similarity between the applications, as it is then extremely difficult to determine an optimised data distribution for data that is accessed and/or manipulated by multiple applications.

Other attempts to reduce the number of distributed database transactions have entailed attempting to determine a set of minimum data objects that are involved in a database transaction and defining this as the smallest unit of logical data partitioning to be implemented within the database. The idea underlying these solutions is to define a logical scope of the data where serializability must be maintained. Nevertheless, the definitions required by this kind of approach are static and assumes a previous knowledge of the data used by the different applications, which can also vary (e.g. in different releases of an application). Furthermore, with these kinds of solutions, the distributed database needs to be configured according to static client/application related data, in order to distribute the data so as to maintain serializability in this logical data partitioning. However, this does not hold under dynamic, rapidly evolving network usage conditions, and even less so in telecommunications network convergence and data consolidation scenarios (e.g. scenarios where a common back-end data repository provided by a distributed database stores data of a plurality of users that are utilized by different kind of telecommunication nodes, such as HLRs, HSSs, PCRFs, etc). In these scenarios, new applications/services are routinely added as and when required (i.e. as clients of the distributed database).

SUMMARY

It is an aim of the present invention to overcome, or at least mitigate, the above-mentioned problems. In particular, it is an aim of the present invention to improve the performance of a distributed database.

According to a first aspect of the present invention there is provided a method of operating a distributed database comprising a plurality of database nodes each storing a plurality of data objects. The method comprises, when executing a database transaction that requires data operations be performed on a plurality of data objects that are distributed between two or more of the database nodes, grouping the data objects that are involved in the database transaction at one of the plurality of database nodes.

The step of grouping of the data objects at one of the plurality of database nodes can comprise storing the data objects that are involved in the database transaction at the one of the plurality of database nodes as a data object group. In addition, or alternatively, the grouping of the data objects at one of the plurality of database nodes can comprise selecting one of the plurality of database nodes that is to store the data objects that are involved in the database transaction, and, for each of the data objects that are involved in the database transaction and that are not stored at the selected database node, copying the data object from a further database node that currently stores the data object to the selected database node. The method may then further comprise, for each of the data objects that are involved in the database transaction and that are not stored at the selected database node, when copying the data object from the further database node that currently stores the data object to the selected database node, deleting the data object from the further database node.

Alternatively, the grouping of the data objects at one of the plurality of database nodes may comprise selecting one of the plurality of database nodes that is to store the data objects that are involved in the database transaction, for each of the data objects that are involved in the database transaction and that are not stored at the selected database node, copying all of the data objects that are part of the same data object group as the data object from a further database node that currently stores the data object group to the selected database node, and storing the copied data objects at the selected database node as a data object group. The method may then further comprise, for each of the data objects that are involved in the database transaction and that are not stored at the selected database node, when copying all of the data objects that are part of the same data object group as the data object from the further database node that currently stores the data object group to the selected database node, deleting the data object group from the further database node.

The method may then further comprise, when executing a database transaction that requires creation of one or more data objects within the distributed database, grouping the data objects created by the database transaction at one of the plurality of database nodes. The step of grouping of the created data objects at one of the plurality of database nodes may then further comprise selecting one of the plurality of database nodes that is to store the created data objects, and storing the data objects created by the database transaction at the selected database node as a data object group.

The method may further comprise allocating a data object group identifier to the data object group that uniquely identifies the data object group within the distributed database.

The method may further comprise, when executing a first database transaction that requires at least one data operation be performed on at least one data object which is part of a data object group, locking the data object group so as to prevent data operations that may be required on any of the data objects that are part of the data object group by a second database transaction. The data object group may be unlocked so as to allow data operations that may be required by a second database transaction upon completion of the first database transaction, and/or expiry of a lock timer that is started when the data object group is locked and that limits the duration for which the data object group can be locked.

The method may further comprise associating a group duration threshold timer with a data object group, starting the group duration threshold timer when the data object group is either created or modified by adding or removing one or more data objects to the data object group, and, when the group duration threshold timer expires, allowing the data objects that are part of the object group to be stored at different database nodes. When the group duration threshold time expires, the method may further comprise distributing the data objects that are part of the data object group to two or more of the database nodes, or discontinuing an association between the data objects that are part of the data object group such that any of the data objects can be subsequently moved to a different database node or can be subsequently associated with a different data object group.

The method may further comprise associating a database transaction interval timer with a data object that is part of a data object group, wherein the database transaction interval timer is reset when the data object is involved in a database transaction, and, when the database transaction interval time expires, allowing the data object to be stored at a different database node to that which stores the data object group. When the database transaction interval time expires, the method may further comprise distributing the data object to a database node other than that which stores the data object group, or discontinuing an association between the data object and the data object group such that the data object can be subsequently moved to different database node or can be subsequently associated with a different data object group.

The steps of the method may be executed or ordered by a data distribution manager of the distributed database implemented by any of:

a data distribution node that communicates with the plurality of database nodes;

a client interface node that communicates with database clients and the plurality of database nodes; and a database node of the plurality of database nodes.

According to a second aspect of the present invention there is provided a distributed database comprising a plurality of database nodes each storing a plurality of data objects, and being configured to implement the method according to the first aspect of the present invention.

According to a third aspect of the present invention there is provided an apparatus configured to provide a data distribution management function within a distributed database, the distributed database comprising a plurality of database nodes each storing a plurality of data objects. The apparatus comprises a receiver configured to receive requests relating to a database transactions that requires data operations be performed on a plurality of data objects that are distributed between two or more of the database nodes, and a processor configured to execute grouping of the data objects that are involved in the database transaction at one of the plurality of database nodes.

The processor may be configured to generate instructions that cause the database nodes of the distributed database to store the data objects that are involved in the database transaction at the one of the plurality of database nodes as a data object group, and the apparatus may then further comprise a transmitter configured to send the instructions to the database nodes.

The processor may be further configured to select one of the plurality of database nodes that is to store the data objects that are involved in the database transaction, and to generate instructions that cause the database nodes to copy each of the data objects that are involved in the database transaction and that are not stored at the selected database node from a further database node that currently stores the data object to the selected database node. The processor may then also be configured to generate instructions that cause the database nodes to delete a data object from the further database node that currently stores the data object when the data object is copied to the selected database node.

Alternatively, the processor may be further configured to select one of the plurality of database nodes that is to store the data objects that are involved in the database transaction, and to generate instructions that cause the database nodes to, for each of the data objects that are involved in the database transaction and that are not stored at the selected database node, copy all of the data objects that are part of the same data object group as the data object from a further database node that currently stores the data object group to the selected database node; and to store the copied data objects at the selected database node as a data object group. The processor may then also be configured to generate instructions that cause the database nodes to delete the data object group from the database node that currently stores the data object when copying all of the data objects that are part of the same data object group as the data object from the further database node to the selected database node.

The receiver may be configured to receive requests relating to a database transaction that requires creation of one or more data objects within the distributed database, and the processor may then be configured to generate instructions that cause the database nodes to group the data objects created by the database transaction at one of the plurality of database nodes. The processor may then be further configured to select one of the plurality of database nodes that is to store the created data objects, and to generate instructions that cause the selected database node to store the data objects created by the database transaction as a data object group.

The processor may be further configured to allocate a data object group identifier to the data object group that uniquely identifies the data object group within the distributed database.

For a first database transaction that requires at least one data operation be performed on at least one data object which is part of a data object group, the processor may be further configured to lock the data object group so as to prevent data operations that may be required by a second database transaction on any of the data objects that are part of the data object group. The processor may then be further configured to unlock the data object group so as to allow data operations that may be required by a second database transaction upon completion of the first database transaction, and/or expiry of a lock timer that is started when the data object group is locked and that limits the duration for which the is part of an data object group can be locked.

The processor may be further configured to generate instructions that cause the database nodes to associate a group duration threshold timer with a data object group that is to be started when the data object group is either created or modified by adding or removing one or more data objects to the data object group and that, upon expiry, allows the data objects that are part of the object group to be stored at different database nodes.

The processor may be further configured to generate instructions that cause the database nodes to associate a database transaction interval timer with a data object that is part of a data object group, that is reset when the data object is involved in a database transaction, and that, when the database transaction interval time expires, allows the data object to be stored at a different database node to that which stores the data object group.

BRIEF DESCRIPTION OF THE DRAWINGS

Some embodiments of the present invention will now be described in detail with reference to the accompanying drawings, in which:

FIG. 2 is a flow diagram illustrating an implementation of a database transaction that requires creation of one or more data objects in accordance with the methods described herein;

FIG. 3 is a flow diagram illustrating an implementation of a distributed database transaction in accordance with the methods described herein;

FIG. 4 is a flow diagram illustrating an implementation of the aggregation of data objects in accordance with the methods described herein;

FIG. 5 is a flow diagram illustrating an implementation of the aggregation of data objects in accordance with the methods described herein;

DETAILED DESCRIPTION OF CERTAIN EMBODIMENTS

Figure 1:
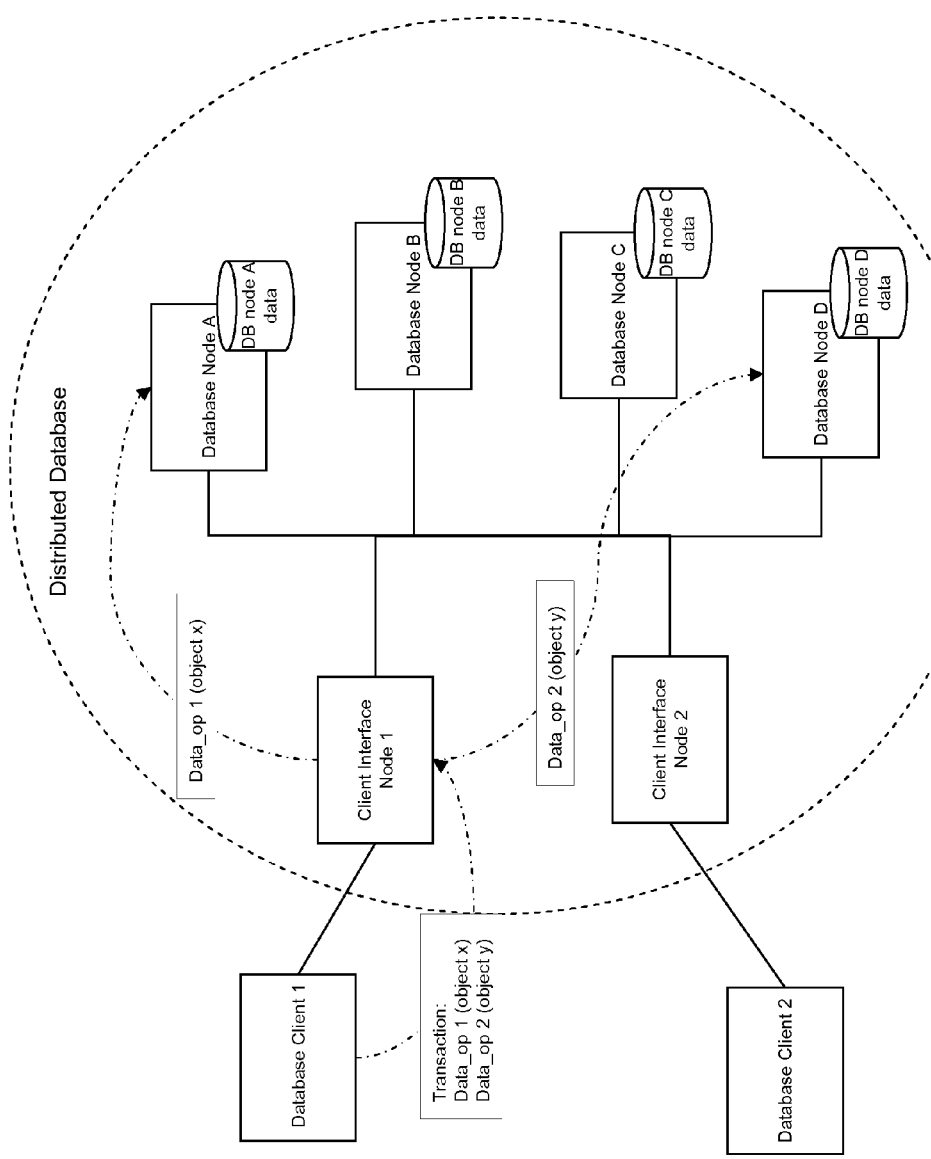
FIG. 1 illustrates schematically an example of a distributed database system providing data access to database clients.

There will now be described methods and apparatus that improve the performance of a distributed database by reducing the amount of distributed database transactions that a distributed database will be required to execute/implement in response to requests from clients. According to these methods, when executing/implementing a database transaction that requires data operations be performed on a plurality of data objects that are distributed between two or more of the database nodes, the data objects that are involved in the database transaction are grouped at one of the plurality of database nodes. The data objects involved in a database transaction are therefore dynamically allocated to a single database node, based upon a database transaction requested by a database client. Consequently, database transactions that require data operations be performed on these data objects can then be executed/implemented by accessing the database node at which the data objects are grouped, without the need for a distributed transaction.

Whilst the process of grouping the data objects involved in a database transaction at one of the database nodes will consume some of the processing and communication resources of the distributed database, and may lead to a delay in responding to some requests relating to a database transaction, the increase in the probability that subsequent database transactions can be executed/implemented by a single database node compensates for this initial expense.

FIG. 2 is a flow diagram illustrating one possible implementation that relates to a database transaction that requires creation of one or more data objects. When executing/implementing a database transaction that requires creation of one or more data objects within the distributed database, the distributed database can ensure that the data objects created by the database transaction are stored at one of the plurality of database nodes. To do so, when one or more requests are received that relate to a database transaction that requires creation of one or more data objects (S1), the distributed database can select one of the plurality of database nodes that is to store the created data objects (S2), and store the data objects created by the database transaction at the selected database node as a data object group (S3 to S5). To do so, the distributed database can create a data object group at the selected database node (S3), allocate a data object group identifier to the data object group that uniquely identifies the data object group within the distributed database (S4), and create and store the new data objects at the selected database node as part of the new data object group (S5). In this regard, the data objects that are part of a data object group are preferably stored in association with the data object group identifier, so that an identifier of a data object affected by an operation of a database transaction can be used—directly or indirectly—to determine the data object group to which said data object pertains. This data object group identifier can then be used to refer to the data object group when executing/implementing any subsequent database transactions. The data group identifier of a group can be stored within the DB node storing the data object group, and also in other entities of the distributed database. In one alternative embodiment, a data group identifier can be defined comprising: an identifier usable to identify the particular DB node that stores the data object group, plus an identifier of said group within said DB.

FIG. 3 is a flow diagram illustrating one possible implementation that relates to a database transaction that requires data operations be performed on data objects that are distributed between the database nodes (i.e. a distributed database transaction). When one or more requests are received that relate to a database transaction that requires data operations be performed on data objects that are distributed between the database nodes (T1), the distributed database can select the database node that is to store the data objects that are involved in the database transaction (T2). For example, the distributed database may select the first database node that is involved in the database transaction (i.e. the database node that stores the data object that is the subject of the first data operation). Although, if it is determined that the first database node involved in the database transaction does not have sufficient capacity to store the grouped data objects, the distributed database may select any other database node. Alternatively, the distributed database may select any of the database nodes within the distributed database. However, it would be preferable to select one of the other database nodes that are involved in the database transaction in order to avoid any otherwise unnecessary relocation of data objects.

After the distributed database has determined which of the database nodes is to store the data objects involved in the database transaction, the distributed database will ensure that the data objects that are involved in the database transaction are located at the selected database node (T3). For example, FIG. 4 is a flow diagram illustrating one possible implementation in which the distributed database implements the copying of each of the data objects that are involved in the database transaction and that are not stored at the selected database node, from the database node that currently stores the data object to the selected database node (U1). The selected database node then stores the copied data objects as part of a data object group (U2) (e.g. an existing data object group or a data object group created specifically to store the copied data objects). In addition, the distributed database can then also implement the deletion of a data object after it has been copied to another database node (U3) (i.e. the database node that originally stored a data object deletes the data object after it has been copied to the selected database node).

FIG. 5 is a flow diagram illustrating an alternative implementation in which the distributed database implements the locating of the data object groups of the data objects that are involved in the database transaction at the selected database node. For example, the distributed database can, for each of the data objects that are involved in the database transaction and that are not stored at the selected database node, implement the copying of the data objects from the data object group of which the data object is a part from the database node that currently stores the data object group to the selected database node (V1) (i.e. aggregate all of the data object groups that are involved in a database transaction into a single data object group). The selected database node then stores the copied data objects at the selected database node as a data object group (V2). In addition, the distributed database can then also implement the deletion of a data object group after the data objects that are part of that data object group have been copied to another database node (V3) (i.e. the database node that originally stored a data object deletes the data object after it has been copied to the selected database node). Expanding upon this example, consider a database transaction that requires a first data operation in relation to a first data object and a second data operation in relation to a second data object. The first data object may be stored as part of a first group of data objects, whilst the second data object may be stored as part of a second group of data objects. According to this implementation, the data distribution manager would instruct the database nodes to aggregate both the first data object group and the second data object group at the same database node, and merge both the first data object group and the second data object group to form a single data object group that includes the data objects from both groups.

When executing/implementing a database transaction, the data distribution manager can also instruct a database node that stores a data object group to 'lock' that data object group so as to prevent data operations that are part of any other database transaction from being performed on the data objects that are part of that group. This locking of a data object group prevents collisions between multiple database transactions that may be executed/implemented simultaneously. The data distribution manager can then instruct a database node to unlock a data object group once the database transaction involving that data object group has been completed. In addition, or as an alternative, a database node can be provided and/or configured with a lock timer that is stored in association with a data object group. The lock timer limits the length of time for which a data object group is locked, such that a locked data object group will be automatically unlocked by a database node upon expiry of the lock timer. For example, the lock timer for a data object group can be pre-configured at the database node that stores the data object group, or can be provided to the database node by the data distribution manager. Implementing a lock timer for a locked data object group prevents a failure or malfunction from leaving a data object in a permanently locked state.

A database node can also be provided or configured with a group duration threshold timer that is stored in association with a data object group. The group duration threshold timer can for example be started/re-started when the data object group is either created or modified (e.g. when adding or removing one or more data objects in the data object group), and limits the length of time for which a data object group persists, such that the data object group can be broken up and stored at different database nodes after the group duration threshold timer has expired. For example, upon expiry of the group duration threshold timer, the association between the data objects that are part of the data object group can be discontinued, such that any of the data objects of the group can be subsequently moved to different database node. Additionally, or alternatively, upon expiry of the group duration threshold timer, any of the data objects that are part of the data object group can be subsequently distributed between the database nodes, and/or be subsequently associated to a different data object group. The group duration threshold timer for a data object group can be pre-configured at the database node that stores the data object group, or can be provided to the database node by the data distribution manager. Implementing a group duration threshold timer prevents continuous, unlimited, aggregation of data objects into a data object group over time that could otherwise lead to excessively large data object groups, and also promotes adaptation of the data object groups within the distributed database to the present usage of the data objects by the database clients that send database transaction requests towards the distributed database.

Furthermore, a database node can also be provided and/or configured with a database transaction interval timer that is stored in association with a data object that is part of a data object group. The database transaction interval timer limits the length of time for which the data object remains part of the data object group, if that data object has not been involved in a database transaction. The database transaction interval timer can be started when the data object is initially grouped within a data object group, and can be therefore re-started (i.e. reset) on each occasion that the data object is involved in a database transaction. Upon expiry of the database transaction interval timer, the data object can be separated from the data object group and, thus, stored at a different database node and/or be subsequently associated to a different data object group. For example, this can involve the association between the data object and the data object group being discontinued, such that the data object can be subsequently moved to a different database node, or the automatic distribution of the data object to a different database node. Implementing a database transaction interval timer also promotes adaptation of the data object groups to the present usage of the data objects, by ensuring that a data object that has been made part of a data object group as a result of a data transaction does not remain part that data object group if it is not involved in subsequent database transactions involving the data object group.

In order to implement these methods, at least one data distribution manager is introduced into the distributed database. A data distribution manager then intervenes in database transactions requested by database clients and, for database transactions that require data operations be performed on data objects that are distributed between the database nodes, implements grouping of the data objects that are involved in the database transaction at one of the database nodes. The data distribution manager can be implemented at one or more standalone servers that are introduced into the distributed database. Alternatively, the data distribution manager can be implemented at one or more of the client interface nodes of the distributed database. As a further alternative, the data distribution manager can be implemented at one or more of the database nodes of the distributed database.

Figure 6:
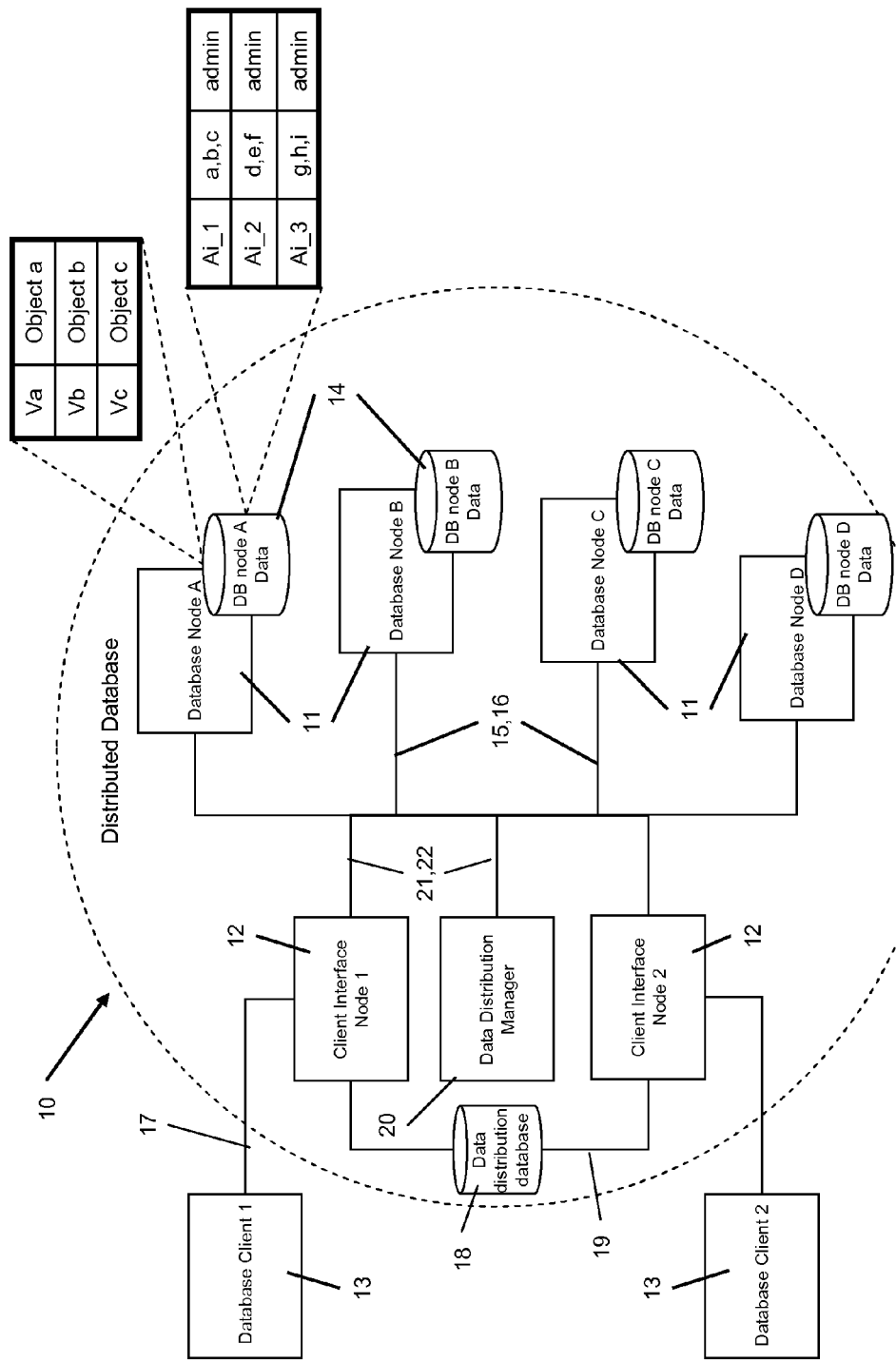
FIG. 6 illustrates schematically an example of a distributed database system suitable for implementing the methods described herein.

FIG. 6 illustrates schematically an example of a distributed database system 10 that operates in accordance with the methods outlined above. The distributed database 10 is comprised of a number of database nodes 11, and a number of client interface nodes 12 with which database clients 13 interact in order to access the data stored in the distributed database 10. Each database node 11 has a storage unit 14 for storing data objects, and an interface 15 to one or more of the client interface nodes 12. Each database node 11 may also have an interface 16 to one or more of the other database nodes within the distributed database. The client interface nodes 12 also have an interface 17 with one or more database clients of the distributed database via which they receive requests for database transactions.

The distributed database 10 also comprises a data distribution database 18 that maintains a record of which database node of the distributed database stores a particular data object. The client interface nodes 12 each have an interface 19 to the data distribution database 18. The distributed database 10 further comprises a data distribution manager 20 that implements the functionality described above. The data distribution manager 20 has an interface 21 with each of the client interface nodes 12, and an interface 22 with each of the database nodes 11.

As described above, each of the database nodes 11 stores a plurality of data objects, and each of the data objects stored within the database are indexed by an index vector, wherein an index vector includes one or more valid indexes that can be used to address the data object. For example, for a data object "a", the index vector can be expressed as:

$$Va=(a1,a2)$$

wherein a1 and a2 are valid indexes for data object a. The index vector for each data object is therefore stored in the data distribution database 18 together with a location/pointer to the data object that identifies which of the database nodes stores the data object.

In addition, the index vector for a data object is stored with the data object at the database node 11 that stores the data object. For example, as illustrated in FIG. 2, database node A stores data objects a, b, and c together with their respective index vectors Va, Vb, and Vc. Each database node 11 also stores data object group information for each of the data object groups that are stored at the database node. This data object group information includes an identifier for the data object group, the identities of each data object that is a part/member of the data object group, and any other administrative data relating to the data object group. For example, as illustrated in FIG. 2, database node A stores the data object information for three different data object groups identified respectively as Ai_1, Ai_2, and Ai_3. The administrative data for each data object group can include, but is not limited to, the lock status of the data object group (i.e. locked or unlocked), a lock timer, and a group duration threshold timer for the group.

Figure 7:
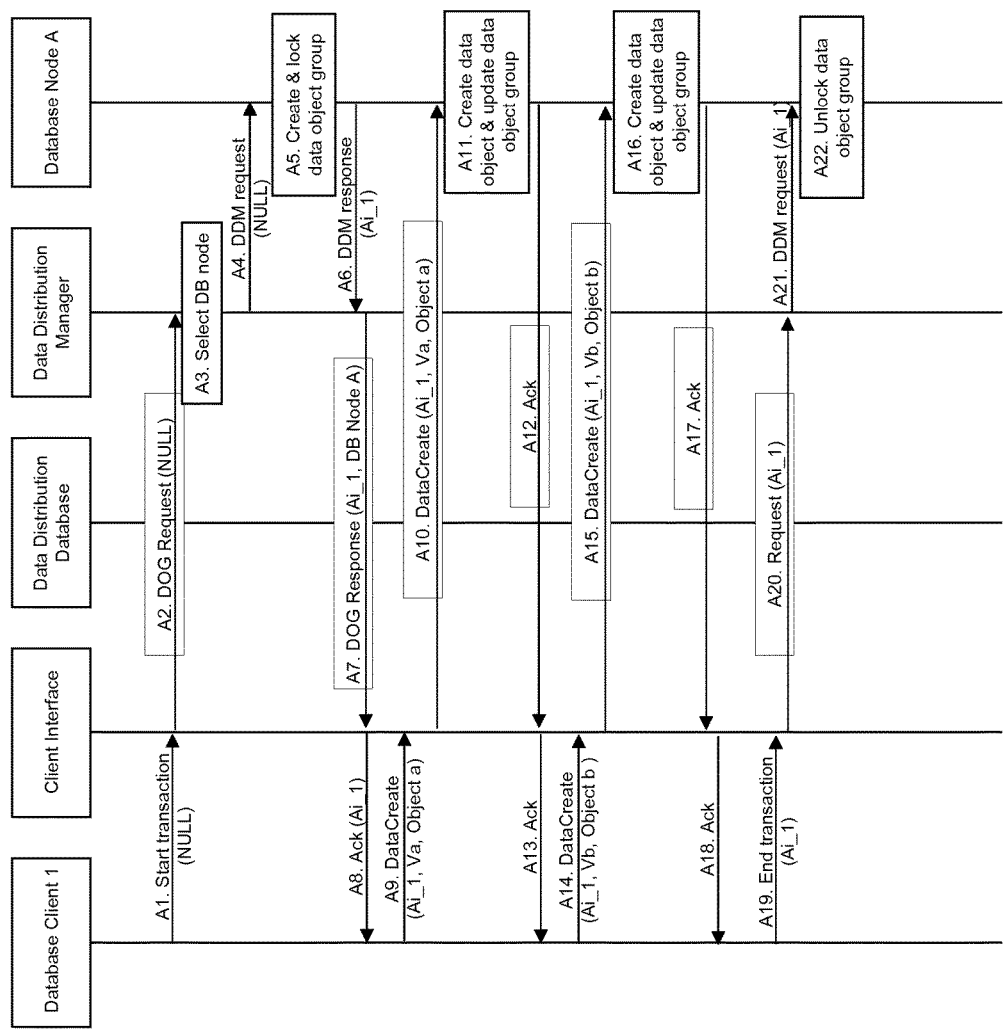
FIG. 7 is a signalling flow diagram illustrating an example of a database transaction executed/implemented in accordance with the methods described herein.

FIG. 7 is a signalling flow diagram illustrating an example of a database transaction executed/implemented by the distributed database of FIG. 2, in which the database transaction involves the creation of data objects. The steps performed are as follows:

A1. A database client determines that a database transaction desired, the database transaction including the creation of a first data object, object a, and the creation of a second data object, object b. The database client therefore generates a request to start a database transaction, and does not include a data object index (i.e. sets this parameter to NULL as no index yet exists for these new data objects). The database client sends the request to a client interface node of the distributed database.

A2. The client interface node receives the request to start a database transaction that does not include a data object index, and therefore recognises that this transaction will require the creation of one or more data objects. The client interface node therefore generates and sends a data object group (DOG) request to the data distribution manager, and does not include a data object index. The DOG request indicates to the data distribution manager that the client interface requires a database transaction involving the creation of one or more data objects.

A3. The data distribution manager receives the DOG request from the client interface node, and therefore implements the selection of a database node that is to store the data objects that are to be created. In this example, the data distribution manager selects database node A, and stores an identifier for database node A in a temporary memory or cache.

A4. The data distribution manager then generates and sends a data distribution management (DDM) request to database node A, and does not include a data object index. The DDM request indicates to database node A that a database transaction is required that involves the creation of one or more data objects.

A5. Database node A receives the DDM request from the data distribution manager, and therefore creates a new data object group, assigns a data object group identified to the new data object group, and locks the new data object group. In this example, the data object group identifier assigned to the data object group is Ai_1

A6. Database node A then generates and sends a DDM response to the data distribution manager, including the data object group identifier (Ai_1). The DDM response indicates to the data distribution manager that a new data object group has been successfully created and locked.

A7. The data distribution manager receives the DDM response from database node A and stores the data object group identifier (Ai_1) in association with the identifier of database node A previously stored in step A3. The data distribution manager then generates and sends a DOG response to the client interface node, including the data object group identifier (Ai_1) obtained from the database node A and the identifier of database node A. This DOG response indicates to the client interface node that a new data object group has been created for the new data objects.

A8. The client interface node receives the DOG response from the data distribution manager that identifies the newly created data object group (Ai_1) and the database node that stores the newly created group. The client interface node therefore stores the data object group identifier in association with the identifier of database node A in a temporary memory. The client interface node then generates and sends an acknowledgement message to the database client, including the data object group identifier (Ai_1), which indicates that the database transaction has been initiated.

A9. The database client receives the acknowledgement message from the client interface node, obtains the data object group identifier from the acknowledgement message and stores the data object group identifier in a temporary memory or cache. The database client can therefore use the data object group identifier in subsequent requests that are relate to the database transaction in order to enable the other nodes of the distributed database to associate requests that belong to the same database transaction. The database client then generates a data creation (DataCreate) request for the first data object of the database transaction. The data creation request includes the first data object (object a), together with the data object group identifier (Ai_1) received from the client interface node in step A8, and an index vector (Va) for the new data object. The database client sends the DataCreate request to the client interface node.

A10. The client interface node receives the DataCreate request from the database client. The client interface therefore sends the DataCreate request to database node A (i.e. using the identifier for database node A stored in association with the data object group identifier (Ai_1) during step A7).

A11. Database node A receives the DataCreate request and executes/implements the creation of the first data object (object a). To do so, database node A stores data object a and it's associated index vector, and updates the data object group information for the identified data object group (Ai_1) to indicate that object a is a part/member of the group.

A12. Database node A then generates and sends an acknowledgement message to the client interface node that indicates that the requested data creation has been successfully executed/implemented.

A13. The client interface node receives the acknowledgement of the successful implementation of the creation of the first data object and forwards the acknowledgement to the database client.

A14. The database client receives the acknowledgement that the creation of the first data object of the database transaction has been implemented successfully, and therefore generates another DataCreate request for the second data object (object b). This data creation request includes the second data object (object b), together with the data object group identifier (Ai_1) received from the client interface node in step A8, and an index vector (Vb) for the new data object. The database client sends the DataCreate request to the client interface node.

A15. The client interface node receives the DataCreate request from the database client. The client interface therefore sends the DataCreate request to database node A (i.e. using the identifier for database node A stored in association with the data object group identifier (Ai_1) during step A7).

A16. Database node A receives the DataCreate request and executes/implements the creation of the second data object (object b). To do so, database node A stores data object b and it's associated index vector, and updates the data object group information for the identified data object group (Ai_1) to indicate that object b is a part/member of the group.

A17. Database node A then generates and sends an acknowledgement message to the client interface node that indicates that the requested data creation has been successfully implemented.

A18. The client interface node receives the acknowledgement of the successful implementation of the creation of the second data object and forwards the acknowledgement to the database client.

A19. The database client receives the acknowledgement that the creation of the second data object of the database transaction has been implemented successfully, and therefore generates and sends a request to end the database transaction, including the data object group identifier (Ai_1), to the client interface node.

A20. The client interface node receives the further end transaction request from the database client. The client interface node therefore generates and sends a yet further DOG request to the data distribution manager, and includes the data object group identifier (Ai_1) received in the end transaction request. This DOG request indicates to the data distribution manager that the client interface node requires that the database transaction be closed.

A21. The data distribution manager receives the DOG request from the database client and uses the identified data object group (Ai_1) to determine that the request relates to the data transaction started in step A3. The data distribution manager therefore generates and sends a further DDM request to database node A including the data object group identifier (Ai_1). This DDM request indicates to database node A that the database transaction initiated in step A5 is to be ended.

A22. Database node A receives the DDM request, including the data object group identifier (Ai_1), from the data distribution manager. Database node A therefore determines that the transaction is to be ended and unlocks the identified data object group. If required, database node A can send a response to the data distribution manager acknowledging the DDM request to end the transaction, thereby confirming that the data object group has been unlocked.

Figure 8:
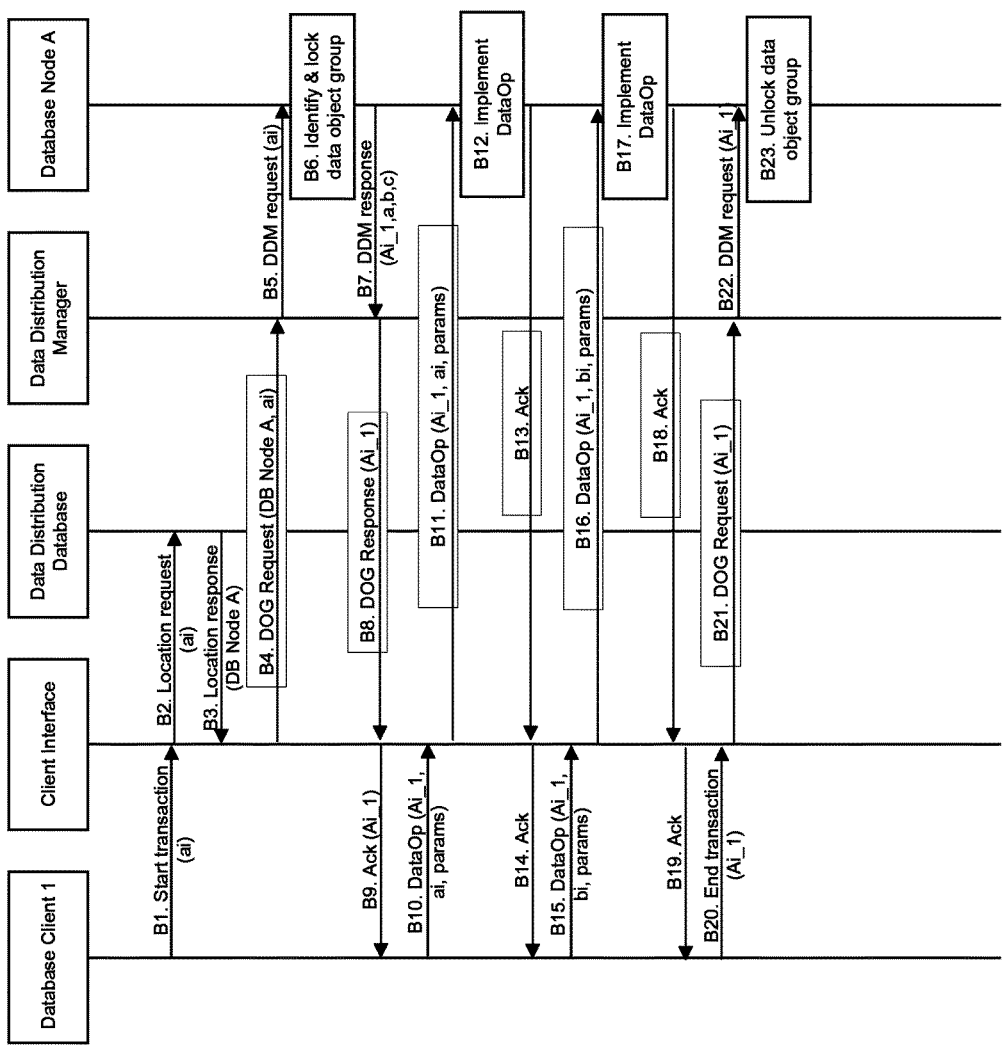
FIG. 8 is a signalling flow diagram illustrating an example of a database transaction executed/implemented in accordance with the methods described herein.

FIG. 8 is a signalling flow diagram illustrating an example of a database transaction executed/implemented by the distributed database of FIG. 2, in which the database transaction involves data objects that are part of the same data object group. The steps performed are as follows:

B1. A database client determines that a database transaction is desired, the database transaction including a first data operation on a first data object (object a) identified by index ai and a second data operation on a second data object (object b) identified by index bi. The database client therefore generates a request to start a database transaction, and includes the index for the first data object. The database client sends the request to a client interface node of the distributed database.

B2. The client interface node receives the request to start a database transaction, and therefore generates and sends a location request to the data distribution database, including index ai, in order to determine which of the database nodes stores the first data object.

B3. The data distribution database receives the location request and performs a lookup using the index ai in order to determine which of the database nodes stores the first data object. The data distribution database determines that database node A stores the first data object, and therefore generates and sends a location response to the client interface node that identifies database node A.

B4. The client interface node receives the location response that identifies database node A from the data distribution database, and stores the identifier for database node A in a temporary memory or cache. The client interface node then generates and sends a DOG request to the data distribution manager, including index ai and an identifier for database node A. The DOG request indicates to the data distribution manager that the client interface requires a database transaction involving the first data object (identified by index ai) and that this data object is stored at database node A.

B5. The data distribution manager receives the DOG request from the client interface node, and therefore generates and sends a DDM request to database node A including index ai. The DDM request indicates to database node A that a database transaction is required that involves the first data object, identified by index ai.

B6. Database node A receives the DDM request, including index ai, from the data distribution manager. Database node A therefore identifies the data object group of which the first data object is a part and locks the identified data object group. In this example, the identified data object group has the data object group identifier, Ai_1, and includes data objects a, b, and c.

B7. Database node A then generates and sends a DDM response to the data distribution manager, including the data object group identifier, Ai_1, and identifying all of the data objects in the data object group (e.g. the data object group information, including the data object indexes). The DDM response indicates to the data distribution manager that the first data object, identified in the DDM request, is stored in data object group Ai_1 and that the data group has been successfully locked.

B8. The data distribution manager receives the DDM response from database node A and stores the data object group identifier (Ai_1) and the identities of the data objects in the data object group (a, b, c) in a temporary memory or cache. The data distribution manager then generates and sends a DOG response to the client interface node, including the data object group identifier (Ai_1) obtained from the database node A. This DOG response indicates to the client interface node that the first data object, identified in the DOG request sent in step A4, is part of the identified data object group.

B9. The client interface node receives the DOG response from the data distribution manager that identifies the data object group of which the first data object, identified in the start transaction request sent in step A1, is a member. The client interface node therefore stores the data object group identifier in the temporary memory, in association with the previously stored identifier of database node A. The client interface node then generates and sends an acknowledgement message to the database client, including the data object group identifier (Ai_1), which indicates that the database transaction has been initiated.

B10. The database client receives the acknowledgement message from the client interface node, obtains the data object group identifier from the acknowledgement message and stores the data object group identifier in a temporary memory or cache. The database client can therefore use the data object group identifier in subsequent requests that are relate to the database transaction in order to enable the other nodes of the distributed database to associate requests that belong to the same database transaction. The database client then generates a data operation (DataOp) request for the first database operation of the database transaction. The data operation request includes the index (ai) of the first data object on which the data operation is required, together with the data object group identifier (Ai_1) received from the client interface node in step A9, and the parameters of the first data operation (e.g. instructions to modify or delete the data object, new attributes to be added to the data object, and/or identifying any attributes that are to be modified or deleted). The database client sends the DataOp request to the client interface node.

B11. The client interface node receives the DataOp request from the database client. The client interface node therefore sends the DataOp request to database node A (i.e. using the identifier for database node A stored in association with the data object group identifier (Ai_1) during step A9).

B12. Database node A receives the DataOp request and executes/implements the first data operation on the first data object (a) in accordance with the parameters included in the DataOp request.

B13. Database node A then generates and sends an acknowledgement message to the client interface node that indicates that the requested data operation has been successfully implemented.

B14. The client interface node receives the acknowledgement of the successful implementation of the first database operation and forwards the acknowledgement to the database client.

B15. The database client receives the acknowledgement that the first database operation of the database transaction has been implemented successfully, and therefore generates another DataOp request for the second database operation of the database transaction. The data operation request includes the index (bi) of the second data object on which the data operation is required, the data object group identifier (Ai_1) received from the client interface node in step A9, and the parameters of the second data operation. The database client sends this further DataOp request to the client interface node.

B16. The client interface node receives the further DataOp request from the database client. The client interface therefore sends the DataOp request to database node A (i.e. using the identifier for database node A stored in association with the data object group identifier (Ai_1) during step A9).

B17. Database node A receives the DataOp request and executes/implements the second data operation on the second data object (b) in accordance with the parameters included in the DataOp request.

B18. Database node A then generates and sends an acknowledgement message to the client interface node that indicates that the requested data operation has been successfully implemented.

B19. The client interface node receives the acknowledgement of the successful implementation of the second database operation and forwards the acknowledgement to the database client.

B20. The database client receives the acknowledgement that the second database operation of the database transaction has been implemented successfully, and therefore generates and sends a request to end the database transaction, including the data object group identifier (Ai_1), to the client interface node.

B21. The client interface node receives the further end transaction request from the database client. The client interface node therefore generates and sends a yet further DOG request to the data distribution manager, and includes the data object group identifier (Ai_1) received in the end transaction request. This DOG request indicates to the data distribution manager that the client interface node requires that the database transaction be closed.

B22. The data distribution manager receives the DOG request from the database client and uses the identified data object group (Ai_1) to determine that the request relates to the data transaction started in step A5. The data distribution manager therefore generates and sends a further DDM request to database node A including the data object group identifier (Ai_1). This DDM request indicates to database node A that the database transaction initiated in step A6 is to be ended.

B23. Database node A receives the DDM request, including the data object group identifier (Ai_1), from the data distribution manager. Database node A therefore determines that the transaction is to be ended and unlocks the identified data object group. If required, database node A can send a response to the data distribution manager acknowledging the DDM request to end the transaction, thereby confirming that the data object group has been unlocked.

Figure 9A:
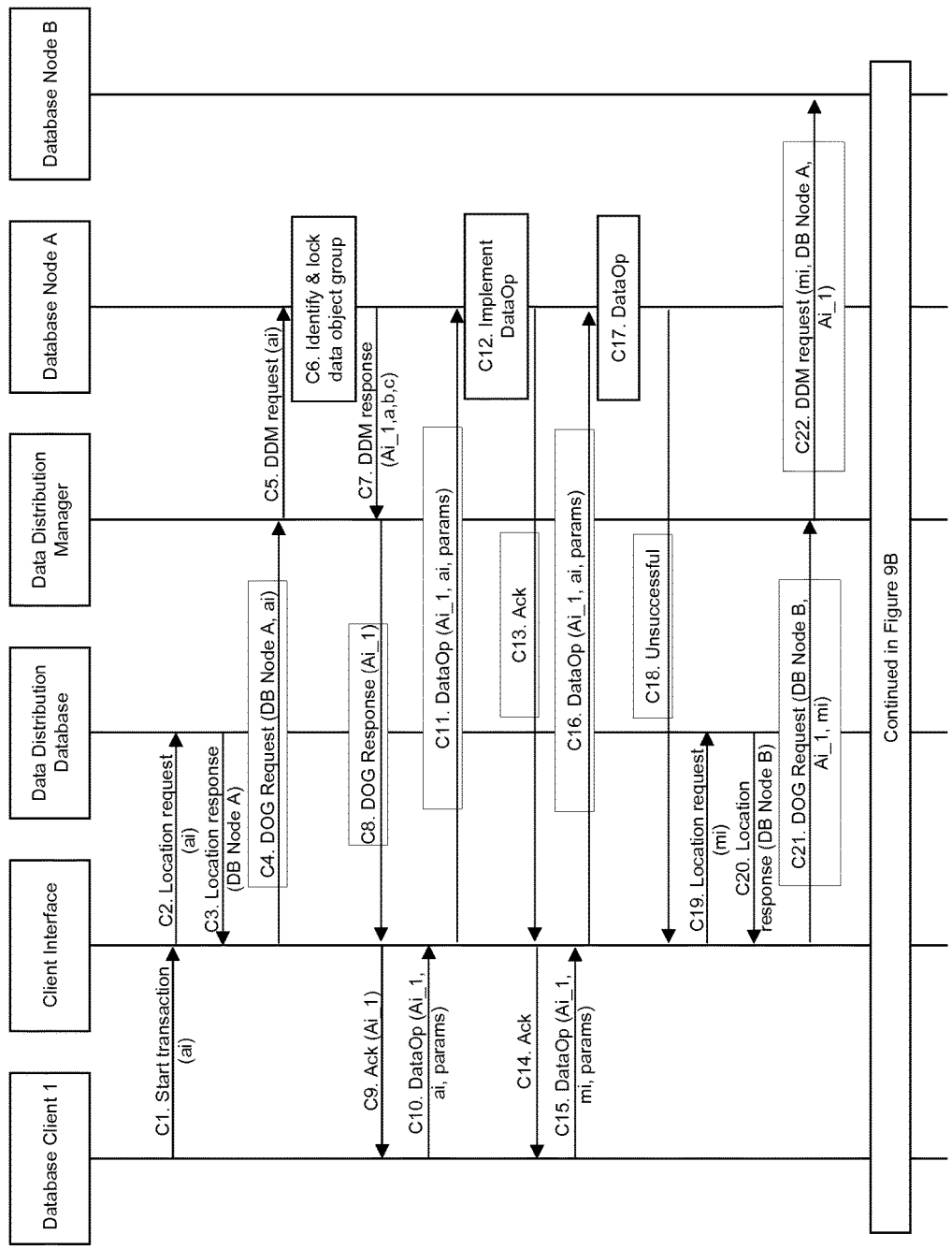
FIGS. 9A and 9B are signalling flow diagrams illustrating an example of a database transaction executed/implemented in accordance with the methods described herein.
Figure 9B:
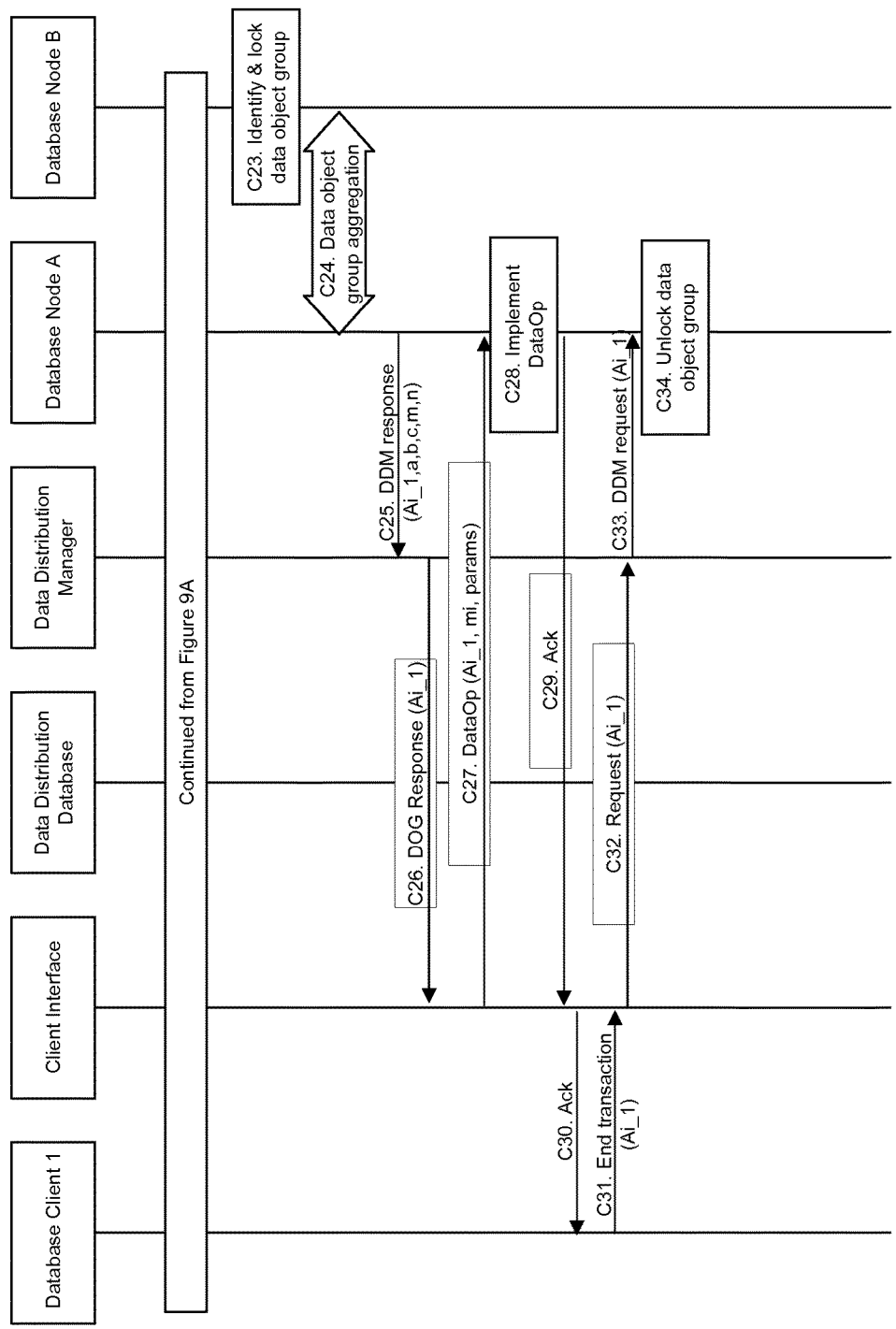

FIGS. 9A and 9B are signalling flow diagrams illustrating an example of a database transaction executed/implemented by the distributed database of FIG. 2, in which the database transaction involves data objects that are distributed between the database nodes of a distributed database. The steps performed are as follows:

C1. A database client determines that a database transaction is desired, the database transaction including a first data operation on a first data object (object a) identified by index ai and a second data operation on a second data object (object m) identified by index mi. The database client therefore generates a request to start a database transaction, and includes the index for the first data object. The database client sends the request to a client interface node of the distributed database.

C2. The client interface node receives the request to start a database transaction, and therefore generates and sends a location request to the data distribution database, including index ai, in order to determine which of the database nodes stores the first data object.

C3. The data distribution database receives the location request and performs a lookup using the index ai in order to determine which of the database nodes stores the first data object. The data distribution database determines that database node A stores the first data object, and therefore generates and sends a location response to the client interface node that identifies database node A.

C4. The client interface node receives the location response that identifies database node A from the data distribution database, and stores the identifier for database node A in a temporary memory or cache. The client interface node then generates and sends a DOG request to the data distribution manager, including index ai and an identifier for database node A. The DOG request indicates to the data distribution manager that the client interface requires a database transaction involving the first data object (identified by index ai) and that this data object is stored at database node A.

C5. The data distribution manager receives the DOG request from the client interface node, and therefore generates and sends a DDM request to database node A including index ai. The DDM request indicates to database node A that a database transaction is required that involves the first data object, identified by index ai.

C6. Database node A receives the DDM request, including index ai, from the data distribution manager. Database node A therefore identifies the data object group of which the first data object is a part and locks the identified data object group. In this example, the identified data object group has the data object group identifier, Ai_1, and includes data objects a, b, and c.

C7. Database node A then generates and sends a DDM response to the data distribution manager, including the data object group identifier, Ai_1, and identifying all of the data objects in the data object group (e.g. the data object group information including the data object indexes). The DDM response indicates to the data distribution manager that the first data object, identified in the DDM request, is stored in data object group Ai_1 and that the data group has been successfully locked.

C8. The data distribution manager receives the DDM response from database node A and stores the data object group identifier (Ai_1) and the identities of the data objects in the data object group (a, b, c) in a temporary memory or cache. The data distribution manager then generates and sends a DOG response to the client interface node, including the data object group identifier (Ai_1) obtained from the database node A. This DOG response indicates to the client interface node that the first data object, identified in the DOG request sent in step C4, is part of the identified data object group.

C9. The client interface node receives the DOG response from the data distribution manager that identifies the data object group of which the first data object, (identified in the start transaction request sent in step C1) is a member. The client interface node therefore stores the data object group identifier in the temporary memory in association with the previously stored identifier of database node A. The client interface node then generates and sends an acknowledgement message to the database client, including the data object group identifier (Ai_1), which indicates that the database transaction has been initiated.

C10. The database client receives the acknowledgement message from the client interface node, obtains the data object group identifier from the acknowledgement message and stores the data object group identifier in a temporary memory or cache. The database client can therefore use the data object group identifier in subsequent requests that are relate to the database transaction in order to enable the other nodes of the distributed database to associate requests that belong to the same database transaction. The database client then generates a data operation (DataOp) request for the first database operation of the database transaction. The data operation request includes the index (ai) of the first data object on which the data operation is required, together with the data object group identifier (Ai_1) received from the client interface node in step C9, and the parameters of the first data operation. The database client sends the DataOp request to the client interface node.

C11. The client interface node receives the DataOp request from the database client. The client interface therefore sends the DataOp request to database node A (i.e. using the identifier for database node A stored in association with the data object group identifier (Ai_1) during step C9).

C12. Database node A receives the DataOp request and executes/implements the first data operation on the first data object (a) in accordance with the parameters included in the DataOp request.

C13. Database node A then generates and sends an acknowledgement message to the client interface node that indicates that the requested data operation has been successfully implemented.

C14. The client interface node receives the acknowledgement of the successful implementation of the first database operation and forwards the acknowledgement to the database client.

C15. The database client receives the acknowledgement that the first database operation of the database transaction has been implemented successfully, and therefore generates another DataOp request for the second database operation of the database transaction. The data operation request includes the index (mi) of the second data object on which the data operation is required, the data object group identifier (Ai_1) received from the client interface node in step C9, and the parameters of the second data operation. The database client sends this further DataOp request to the client interface node.

C16. The client interface node receives the further DataOp request from the database client. The client interface therefore sends the further DataOp request to database node A (i.e. using the identifier for database node A stored in association with the data object group identifier (Ai_1) during step C9).

C17. Database node A receives the further DataOp request; however, the second data object (m) identified by the index (mi) is not part of the data object group (Ai_1) and is not part of a data object group stored by database node A. Database node A therefore determines that it cannot execute/implement the requested data operation.

C18. Database node A then generates and sends a response to the client interface node, the response indicating that the data operation has been unsuccessful because the data object is not stored by the database node.

C19. The client interface node receives the response from database node A indicating that the implementation of the second database operation has been unsuccessful because the data object is not stored by the database node. The client interface node therefore generates and sends a location request to the data distribution database, including index mi, in order to determine which of the database nodes stores the second data object.

C20. The data distribution database receives the location request and performs a lookup using the index mi in order to determine which of the database nodes stores the second data object. The data distribution database determines that database node B stores the second data object, and therefore generates and sends a location response to the client interface node that identifies database node B.

C21. The client interface node receives the location response that identifies database node B from the data distribution database, and stores the identifier for database node B in the temporary memory or cache. The client interface node then generates and sends a further DOG request to the data distribution manager, including index mi and an identifier for database node B together with the data object group identifier returned by the data distribution manager in step C8. The DOG request indicates to the data distribution manager that the client interface requires a database transaction involving the second data object (identified by index mi), that this data object is stored at database node B, and that this database transaction is associated with the data object group Ai_1. The data object group identifier (Ai_1) therefore effectively serves as an identifier that links any DOG requests that relate to the same transaction.

C22. The data distribution manager receives the further DOG request from the client interface node, and therefore generates and sends a further DDM request to database node B including the index (mi) identifying the second data object, the identifier of database node A, and the data object group identifier (Ai_1) received from the client interface node in the DOG request of step C21. This DDM request therefore indicates to database node B that the identified data object (mi) should be aggregated with the identified data object group (Ai_1) that is stored at the identified database node (database node A).

C23. Database node B receives the DDM request from the data distribution manager. Database node B therefore identifies the data object group of which the second data object is a part and locks the identified data object group. In this example, the identified data object group has the data object group identifier, Bi_1, and includes data objects m and n.

C24. Database node B then cooperates with database node A in order to aggregate the data objects that are a part of data object group Bi_1 stored at database node B with the data objects that are part of object group Ai_1 stored at database node A. For example, database B can copy data objects m and n to database node A. Database node A can then update it's data object group information to indicate that data object group Ai_1 now also includes data objects m and n. Database node B can then delete objects m and n from it's data storage, and update it's data object group information to delete data object group Bi_1. Whilst not illustrated in FIG. 5B, one or both of database node A and database node B will also communicate with the data distribution database in order to update the location information for data objects m and n.

C25. Following the data object group aggregation, database node A then generates and sends a further DDM response to the data distribution manager, including the data object group identifier, Ai_1, and identifying all of the data objects in the data object group (which will now also include data objects m and n). The further DDM response indicates to the data distribution manager that the second data object, identified in the further DDM request, is now stored in data object group Ai_1.

C26. The data distribution manager receives the further DDM response from database node A and stores the updated list of data object identities for the data object group (in the temporary memory or cache. The data distribution manager then generates and sends a further DOG response to the client interface node, including the data object group identifier (Ai_1) obtained from the database node A. This further DOG response indicates to the client interface node that the second data object, identified in the DOG request sent in step C21, is now part of the identified data object group.

C27. The client interface node receives the further DOG response from the data distribution manager that indicates that the data object identified in the DOG request sent in step C21 is now part of the identified data object group (i.e. Ai_1). The client interface therefore sends the DataOp request to database node A (i.e. using the identifier for database node A stored in association with the data object group identifier (Ai_1) during step C9).

C28. Database node A receives the DataOp request and executes/implements the second data operation on the second data object (m) in accordance with the parameters included in the DataOp request.

C29. Database node A then generates and sends an acknowledgement message to the client interface node that indicates that the requested data operation has been successfully implemented.

C30. The client interface node receives the acknowledgement of the successful implementation of the second database operation and forwards the acknowledgement to the database client.

C31. The database client receives the acknowledgement that the second database operation of the database transaction has been implemented successfully, and therefore generates and sends a request to end the database transaction, including the data object group identifier (Ai_1), to the client interface node.

C32. The client interface node receives the further end transaction request from the database client. The client interface node therefore generates and sends a yet further DOG request to the data distribution manager, and includes the data object group identifier (Ai_1)

received in the end transaction request. This DOG request indicates to the data distribution manager that the client interface node requires that the database transaction be closed.

C33. The data distribution manager receives the DOG request from the database client and uses the identified data object group (Ai_1) to determine that the request relates to the data transaction started in step C4. The data distribution manager therefore generates and sends a further DDM request to database node A including the data object group identifier (Ai_1). This DDM request indicates to database node A that the database transaction initiated in step C5 is to be ended.

C34. Database node A receives the DDM request, including the data object group identifier (Ai_1), from the data distribution manager. Database node A therefore determines that the transaction is to be ended and unlocks the identified data object group. If required, database node A can send a response to the data distribution manager acknowledging the DDM request to end the transaction, thereby confirming that the data object group has been unlocked.

In the examples described above, when a client interface node executes/implements a database operations, it sends a request to the data distribution manager that identifies the data object that is the subject of the data operation, and the data distribution manager then contacts the database node that stores the identified data object in order to obtain the identity of the data object group of which the identified data object is part, and the identities of the data objects that are part of that data object group. The data distribution manager then responds to the client interface node with the identity of the data object group. However, as an alternative, the data distribution manager can also include the identities of the data objects that are part of that data object group in the response to the client interface node. The client interface node can then store this information for the duration of the database transaction so that it can confirm whether a subsequent database operation that is part of the database transaction relates to a data object that is part of the same data object group (i.e. rather than having to request this confirmation from the data distribution manager). Doing so would reduce the number of request and response messages that must be sent between the entities that are part of the disturbed database, and thereby provide further optimisation. However, it is also possible that the distributed database can be configured such that a database node merely responds to the data distribution manager with the identity of a data object group, and does not provide the identities of the data objects that are part of that data object group. The data distribution manager would then be required to contact the database node for each requested database operation that is part of a database transaction in order to confirm whether or not the data object that is the subject of the database operation is part of the same data object group.

In the examples described above, a database client executes/implements a database transaction using a sequence of request messages (e.g. a series of related requests, in which each request in the series relates to an individual data operation that is part of the overall database transaction). A data object group identifier is therefore returned to the database client in a response to the first request of a database transaction, such that this data object group identifier can be included in subsequent requests sent by the database client as an identifier for the transaction (i.e. so as to link each of the requests to the same transaction). Alternatively, a distinct database transaction identifier can be generated and inserted into each request that is part of a database transaction in order to hide the details of the data distribution management from the database clients. The client interface node would then associate the database transaction identifier with the data object group identifier of the database node selected for the database transaction, and implement the translation between the database transaction identifier used by the database client and the data object group identifier used within the distributed database.

As a further alternative, instead of a database client requesting a database transaction using a sequence of request messages, a database client could implement a database transaction using a single batch request, this batch request including all of the instructions and data operations that are required as part of the database transaction. The client interface node would then implement each instruction and/or data operation that is part of the batch request in sequence, by issuing individual requests for instruction and/or data operation on behalf of the database client.

Figures 10, 11:
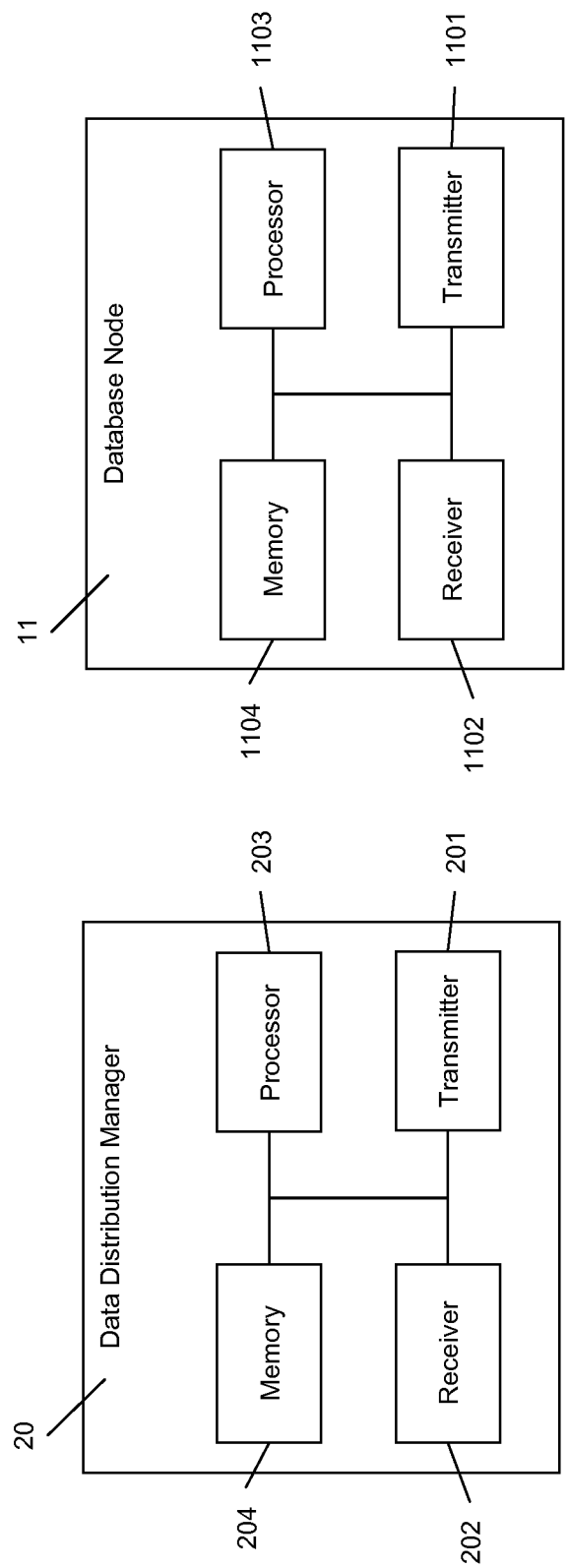
FIG. 10 illustrates schematically an embodiment of a data distribution manager configured to implement the methods described herein.
FIG. 11 illustrates schematically an embodiment of a database node configured to implement the methods described herein.

FIG. 10 illustrates schematically an embodiment of a data distribution manager configured to implement the methods described above. The data distribution manager can be implemented as a combination of computer hardware and software and comprises a transmitter 201, a receiver 202, a processor 203, and a memory 204. The memory stores the various programs/executable files that are implemented by the processor, and also provides a storage unit for any required data. For example, the memory 204 can provide temporary storage of a database node identifier and an associated data object group identifier and identifiers for the data objects that are part of the data object group. The programs/executable files stored in the memory, and implemented by the processor, include but are not limited to a data object group unit for implementing the grouping of data objects that are involved in a database transaction at one of the database nodes in accordance with the method described above.

FIG. 11 illustrates schematically an embodiment of a database node 11 of a distributed database that is configured to implement the methods described above. The database node 11 can be implemented as a combination of computer hardware and software and comprises a transmitter 1101, a receiver 1102, a processor 1103, and a memory 1104. The memory stores the various programs/executable files that are implemented by the processor, and also provides a storage unit for any required data. For example, the memory 1104 can provide storage for a plurality of data objects and their associated index vectors, as well as data object group information for the data object groups formed by the data objects. The programs/executable files stored in the memory, and implemented by the processor, include but are not limited to a data operation unit for implementing the data operations that are part of a database transaction in accordance with the method described above. Such data operations can include the creation of one or more data objects, the provision, modification and/or manipulation of one or more data objects, and the copying, storing and deleting or one or more data objects or data object groups.

The methods and apparatus described above provide that data stored within a distributed database can be automatically redistributed in response to database transactions requested by database clients, wherein this redistribution reduces the amount of distributed database transactions that the distributed database will be required to implement. This automatic adaptation of the distribution of data stored within a distributed database avoids the additional latency introduced by distributed database transactions thereby improving the performance of the distributed database. In addition, whilst the process of redistributing data in response to a database transaction will have performance overheads, these will be relatively low compared to the performance overheads that arise from numerous distributed database transactions that would likely occur without the redistribution of the data. Furthermore, the methods and apparatus described above do not rely on complex data allocation policies that require knowledge of the particular applications that make use of the data. Rather, the methods and apparatus described above dynamically determines the optimum data distribution based on the database transactions implemented by the distributed database, and can also provide for continuous adaptation of the data distribution to the current data usage.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. In addition, whilst the above description refers to a number of data objects that have been grouped as a result of a database transaction as a data object group, such a group of data objects can also referred to as a transaction domain (TD). The identifier that uniquely identifies the transaction domain within the distributed can then be referred to as a transaction domain identifier (TDI).

The invention claimed is:

1. A method of operating a distributed database comprising a plurality of database nodes each storing a plurality of data objects, the method comprising:
   when executing a database transaction that requires data operations be performed on a plurality of data objects that are distributed between at least two of the database nodes, grouping the data objects that are involved in the database transaction at one of the plurality of database nodes;
   the grouping of the data objects at one of the plurality of database nodes comprises storing the data objects that are involved in the database transaction as a data object group at the one of the plurality of database nodes;
   associating a group duration threshold timer with the data object group;
   starting the group duration threshold timer when the data object group is one of created and modified by one of adding and removing at least one data object to the data object group;
   when the group duration threshold timer expires, distributing the data objects that are part of the data object group to at least two of the database nodes; and
   discontinuing an association between the data objects that are part of the data object group such that any of the data objects can be one of subsequently moved to a different database and subsequently associated with a different data object group.

2. The method of claim 1, wherein the grouping of the data objects at one of the plurality of database nodes further comprises:
   selecting one of the plurality of database nodes that is to store the data objects that are involved in the database transaction; and
   for each of the data objects that are involved in the database transaction and that are not stored at the selected database node, copying the data object from a further database node that currently stores the data object to the selected database node.

3. The method of claim 2, further comprising:
   for each of the data objects that are involved in the database transaction and that are not stored at the selected database node, when copying the data object from the further database node that currently stores the data object to the selected database node, deleting the data object from the further database node.

4. The method of claim 1, wherein the grouping of the data objects at one of the plurality of database nodes further comprises:
   selecting one of the plurality of database nodes that is to store the data objects that are involved in the database transaction; and
   for each of the data objects that are involved in the database transaction and that are not stored at the selected database node, copying all of the data objects that are part of the same data object group as the data object from a further database node that currently stores the data object group to the selected database node; and
   storing the copied data objects at the selected database node as a data object group.

5. The method of claim 4, further comprising:
   for each of the data objects that are involved in the database transaction and that are not stored at the selected database node, when copying all of the data objects that are part of the same data object group as the data object from the further database node that currently stores the data object group to the selected database node, deleting the data object group from the further database node.

6. The method of claim 1, further comprising:
   when executing a database transaction that requires creation of at least one data object within the distributed database, grouping the data objects created by the database transaction at one of the plurality of database nodes.

7. The method of claim 6, wherein the grouping of the created data objects at one of the plurality of database nodes comprises:
   selecting one of the plurality of database nodes that is to store the created data objects; and
   storing the data objects created by the database transaction at the selected database node as a data object group.

8. The method of claim 1, further comprising:
   allocating a data object group identifier to the data object group that uniquely identifies the data object group within the distributed database.

9. The method of claim 1, further comprising:
   when executing a first database transaction that requires at least one data operation be performed on at least one data object which is part of a data object group, locking the data object group so as to prevent data operations that may be required on any of the data objects that are part of the data object group by a second database transaction.

10. The method of claim 9, wherein the data object group is unlocked so as to allow data operations that may be required by a second database transaction upon one of:
   completion of the first database transaction; and
   expiry of a lock timer that is started when the data object group is locked and that limits the duration for which the data object group can be locked.

11. The method of claim 1 further comprising:
associating a database transaction interval timer with a data object that is part of a data object group, wherein the database transaction interval timer is reset when the data object is involved in a database transaction; and
when the database transaction interval time expires, allowing the data object to be stored at a different database node to that which stores the data object group.

12. The method of claim 11, wherein, when the database transaction interval time expires, the method further comprises at least one of:
distributing the data object to a database node other than that which stores the data object group; and
discontinuing an association between the data object and the data object group such that the data object can be one of subsequently moved to different database node and subsequently associated with a different data object group.

13. The method of claim 1, wherein the operations of the distributed database are one of executed and ordered by a data distribution manager of the distributed database implemented by one of:
a data distribution node that communicates with the plurality of database nodes;
a client interface node that communicates with database clients and the plurality of database nodes; and
a database node of the plurality of database nodes.

14. An apparatus configured to provide a data distribution management function within a distributed database, the distributed database comprising a plurality of database nodes each storing a plurality of data objects, the apparatus comprising:
a receiver configured to receive requests relating to a database transactions that requires data operations be performed on a plurality of data objects that are distributed between at least two of the database nodes;
a processor configured to:
execute grouping of the data objects that are involved in the database transaction at one of the plurality of database nodes;
generate instructions that cause the database nodes of the distributed database to:
store the data objects that are involved in the database transaction at the one of the plurality of database nodes as a data object group;
associate a group duration threshold timer with the data object group;
start the group duration threshold timer when the data object group is one of created and modified by one of adding and removing at least one data object to the data object group;
upon expiry of the group duration threshold timer, distribute the data objects that are part of the data object group to at least two of the database nodes; and
discontinue an association between the data objects that are part of the data object group such that any of the data objects can be one of subsequently moved to a different database and subsequently associated with a different data object group.

15. The apparatus of claim 14, further comprising a transmitter configured to send the instructions to the database nodes.

16. The apparatus of claim 15, wherein the processor is further configured to generate instructions that cause the database nodes to:
associate a database transaction interval timer with a data object that is part of a data object group, that is reset when the data object is involved in a database transaction, and that, when the database transaction interval time expires, allows the data object to be stored at a different database node to that which stores the data object group.

17. The apparatus of claim 14, wherein the processor is further configured to:
select one of the plurality of database nodes that is to store the data objects that are involved in the database transaction; and
generate instructions that cause the database nodes to copy each of the data objects that are involved in the database transaction and that are not stored at the selected database node from a further database node that currently stores the data object to the selected database node.

18. The apparatus of claim 17,
wherein the processor is further configured to generate instructions that cause the database nodes to delete a data object from the further database node that currently stores the data object when the data object is copied to the selected database node.

19. The apparatus of claim 14, wherein the processor is further configured to:
select one of the plurality of database nodes that is to store the data objects that are involved in the database transaction; and
generate instructions that cause the database nodes to, for each of the data objects that are involved in the database transaction and that are not stored at the selected database node, copy all of the data objects that are part of the same data object group as the data object from a further database node that currently stores the data object group to the selected database node, and to store the copied data objects at the selected database node as a data object group.

20. The apparatus of claim 19, wherein the processor is further configured to generate instructions that cause the database nodes to delete the data object group from the database node that currently stores the data object when copying all of the data objects that are part of the same data object group as the data object from the further database node to the selected database node.

21. The apparatus of claim 14, wherein the receiver is configured to receive requests relating to a database transactions that requires creation of at least one data object within the distributed database, and the processor is configured to generate instructions that cause the database nodes to group the data objects created by the database transaction at one of the plurality of database nodes.

22. The apparatus of claim 21, wherein the processor is further configured to:
select one of the plurality of database nodes that is to store the created data objects; and
generate instructions that cause the selected database node to store the data objects created by the database transaction as a data object group.

23. The apparatus of claim 14, wherein the processor is further configured to allocate a data object group identifier to the data object group that uniquely identifies the data object group within the distributed database.

24. The apparatus of claim 14, wherein, for a first database transaction that requires at least one data operation be performed on at least one data object which is part of a data object group, the processor is further configured to lock the data object group so as to prevent data operations that may be required by a second database transaction on any of the data objects that are part of the data object group.

25. The apparatus of claim 24, wherein the processor is further configured to unlock the data object group so as to allow data operations that may be required by a second database transaction upon one of:
   completion of the first database transaction; and
   expiry of a lock timer that is started when the data object group is locked and that limits the duration for which the is part of a data object group can be locked.

* * * * *